(12) United States Patent
Fujita et al.

(10) Patent No.: US 7,481,493 B2
(45) Date of Patent: Jan. 27, 2009

(54) SEAT STRUCTURE

(75) Inventors: Etsunori Fujita, Hiroshima (JP); Atsuki Sasaki, Kariya (JP); Takeshi Nishiura, Kariya (JP)

(73) Assignees: Toyota Boshoku Corporation, Kariya-Shi, Aichi (JP); Delta Tooling Co., Ltd., Hiroshima-Shi, Hiroshima (JP)

( * ) Notice: Subject to any disclaimer, the term of this patent is extended or adjusted under 35 U.S.C. 154(b) by 0 days.

(21) Appl. No.: 10/576,373

(22) PCT Filed: Oct. 21, 2004

(86) PCT No.: PCT/JP2004/015964

§ 371 (c)(1),
(2), (4) Date: Nov. 7, 2006

(87) PCT Pub. No.: WO2005/037020

PCT Pub. Date: Apr. 28, 2005

(65) Prior Publication Data
US 2007/0152483 A1    Jul. 5, 2007

(30) Foreign Application Priority Data
Oct. 21, 2003    (JP) .............................. 2003-361186

(51) Int. Cl.
*A47C 7/14*    (2006.01)
(52) U.S. Cl. .............................. 297/284.2; 297/452.49; 297/452.56
(58) Field of Classification Search .............. 297/217.2, 297/217.3, 284.11, 452.49, 452.55, 452.56, 297/452.58, 452.59
See application file for complete search history.

(56) References Cited

U.S. PATENT DOCUMENTS

| | | | | |
|---|---|---|---|---|
| 3,273,877 A | * | 9/1966 | Geller et al. | 267/89 |
| 3,924,613 A | * | 12/1975 | Beck | 601/149 |
| 4,203,098 A | * | 5/1980 | Muncheryan | 340/575 |

(Continued)

FOREIGN PATENT DOCUMENTS

| | | | |
|---|---|---|---|
| FR | 2837436 A1 | * | 9/2003 |
| JP | 2243/1984 | | 1/1984 |
| JP | 36755/1984 | | 3/1984 |

(Continued)

OTHER PUBLICATIONS

Machine Translation of Japanese Patent No. 09-238776.*
Machine Translation of Japanese Patent No. 09-238776 (Sep. 16, 1997).*

*Primary Examiner*—David Dunn
*Assistant Examiner*—Patrick D Lynch
(74) *Attorney, Agent, or Firm*—WolfBlock LLP

(57) ABSTRACT

To promote bloodstream and reduce fatigue, a seat structure makes a slight sitting posture change by adding a minute body motion with no necessity of moving a cushion frame or a seat frame although it realizes a supporting pressure change at a wide area, not locally, in a seat cushion or a seat back. The seat structure includes a cushioning member for a seat cushion stretched across the cushion frame, and a cushioning member for a seat back stretched across the back frame. The seat structure includes: a lower cloth spring of a seat cushion or a cloth spring of a seat back stretched across the cushion frame or the back frame via a torsion bar; and a cloth spring adjusting member to change a supporting pressure by both cushioning members by adjusting tension of the lower cloth spring or the cloth spring.

13 Claims, 10 Drawing Sheets

U.S. PATENT DOCUMENTS

| | | | |
|---|---|---|---|
| 4,465,158 A * | 8/1984 | Yamazaki et al. | 180/271 |
| 4,655,505 A * | 4/1987 | Kashiwamura et al. | 297/284.6 |
| 4,702,522 A * | 10/1987 | Vail et al. | 297/452.56 |
| 4,712,834 A * | 12/1987 | Warrick | 297/284.2 |
| 4,798,414 A * | 1/1989 | Hughes | 297/284.4 |
| 5,065,079 A * | 11/1991 | Ogasawara | 318/591 |
| 5,092,654 A * | 3/1992 | Inaba et al. | 297/284.7 |
| 5,439,271 A * | 8/1995 | Ryan | 297/452.56 |
| 5,816,653 A * | 10/1998 | Benson | 297/284.4 |
| 5,990,795 A * | 11/1999 | Miller | 340/576 |
| 6,231,125 B1 * | 5/2001 | Maeda et al. | 297/452.56 |
| 6,392,550 B1 * | 5/2002 | Najor | 340/576 |
| 6,435,618 B1 * | 8/2002 | Kawasaki | 297/452.56 |
| 6,616,229 B2 * | 9/2003 | Kuster et al. | 297/284.9 |
| 6,663,177 B2 * | 12/2003 | Blanco et al. | 297/284.2 |
| 2001/0022458 A1 * | 9/2001 | Kuster et al. | 297/284.2 |
| 2002/0060493 A1 * | 5/2002 | Nishino et al. | 297/452.56 |
| 2002/0096932 A1 * | 7/2002 | Fujita et al. | 297/452.56 |

FOREIGN PATENT DOCUMENTS

| | | |
|---|---|---|
| JP | 64-44355 | 2/1989 |
| JP | 2-136340 | 5/1990 |
| JP | 3-200438 A | 9/1991 |
| JP | 4-224709 | 1/1992 |
| JP | 5-245015 A | 9/1993 |
| JP | 72250/1993 | 10/1993 |
| JP | 5-330360 A | 12/1993 |
| JP | 9-84656 | 3/1997 |
| JP | 9-109757 A | 4/1997 |
| JP | 9-238776 A | 9/1997 |
| JP | 10-146240 A | 6/1998 |
| JP | 2001-150988 A | 6/2001 |
| JP | 2003-182427 A | 7/2003 |
| JP | 2003-363902 | 10/2003 |

* cited by examiner

F I G. 3
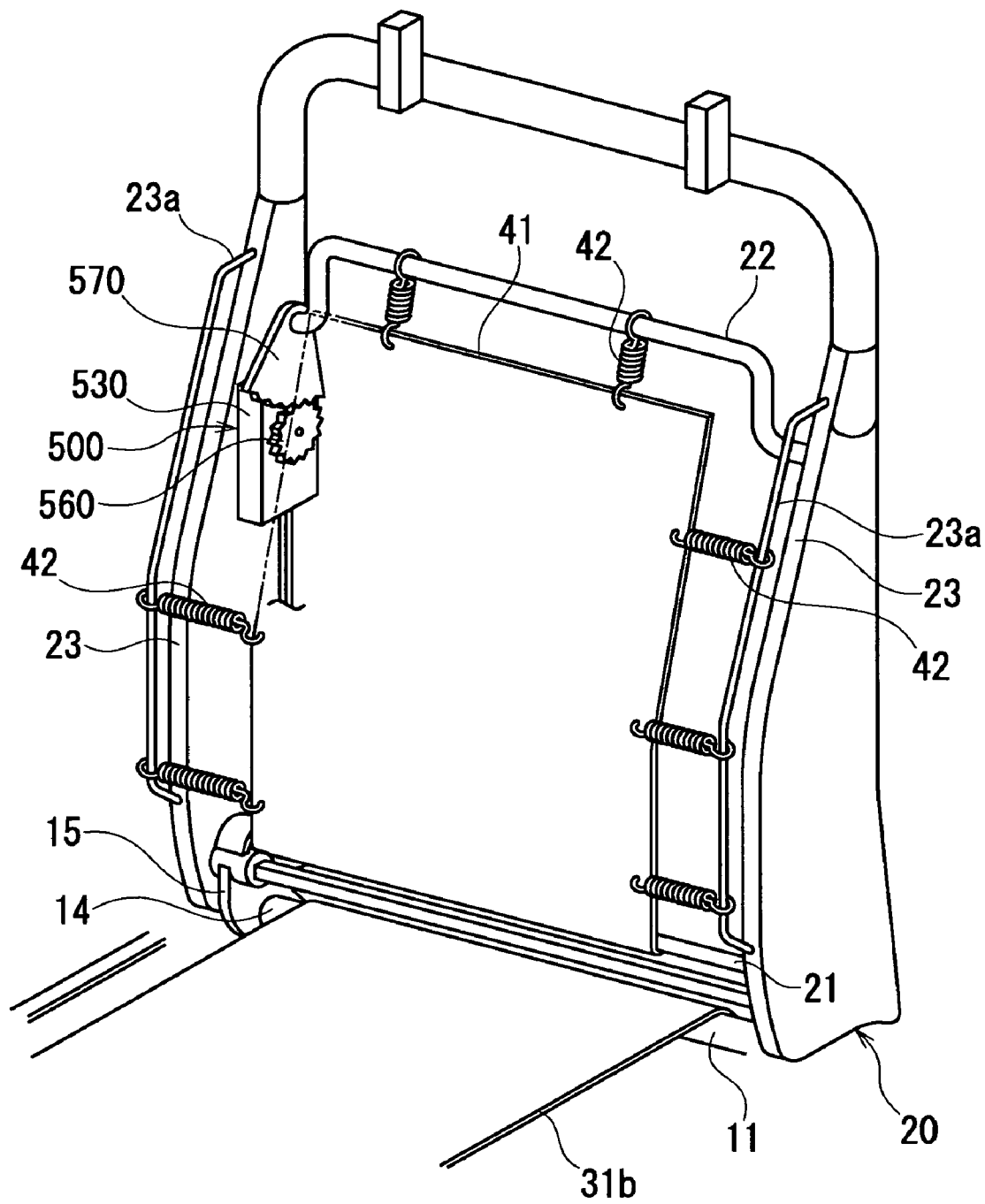

F I G. 4
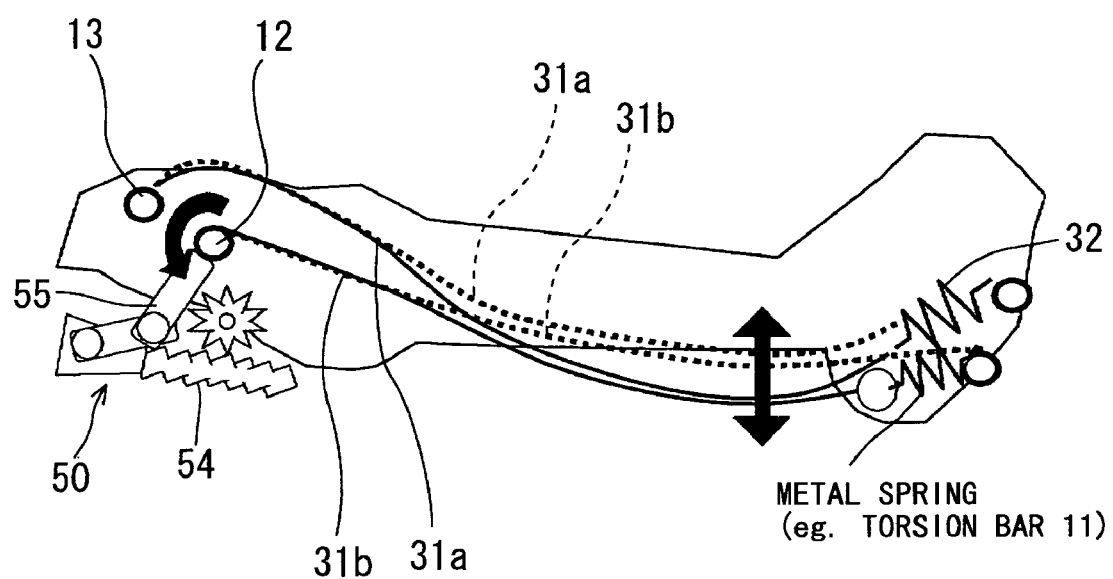

FATIGUE DEGREE COMPARISON ACCORDING TO CONDITIONS FOR CONTROL

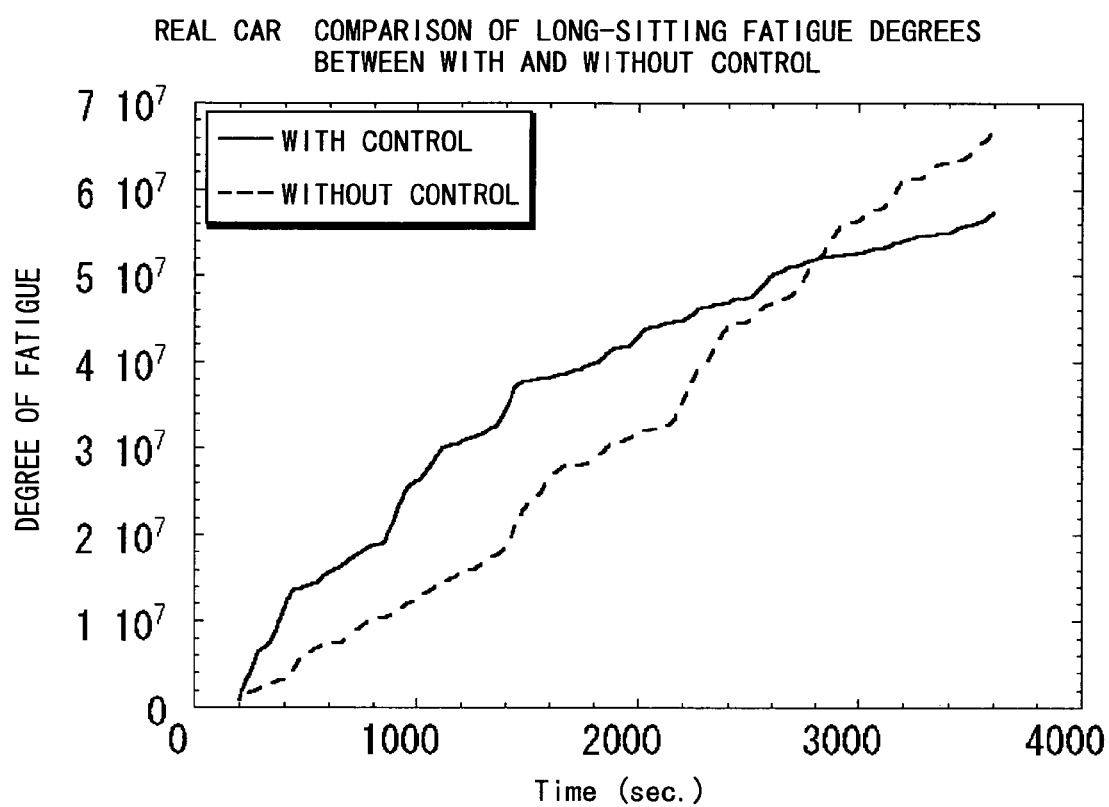

SEAT STRUCTURE

TECHNICAL FIELD

The present invention relates to a seat structure effective at reducing fatigue accumulation by giving a minute sitting posture change or minute body motion to a seated person, especially suitable as a seat for a vehicle such as a car.

BACKGROUND ART

The following technologies are known as those aimed at reducing fatigue by changing the sitting posture of a person sitting for a long time. First, a technology to change a sifting posture through changing a fixed position of a lumbar support provided on a vehicle seat, such as Patent Document 1 (Japanese Patent Application Laid-open No. Sho 64-44355).

Second, a technology to change the angle of the back (vicinity of the lumbar vertebra) and the femur (vicinity of the pelvis) of a seated person at the same angle while fixing the angle (positional relation) between the back and the femur through changing the supporting face angle of the seat cushion and the seat back, such as Patent Document 2 (Japanese Patent Application Laid-open No. Hei 4-224709).

Third, a technology to change a sitting posture through changing a seat shape using a means to perform fuzzy deduction from a driving speed and driving period of time such as Patent Document 3 (Japanese Patent Application Laid-open No. Hei 2-136340).

Fourth, a technology to change a sitting posture through changing the seat state using a means for detecting body motion and a means for supplementing body motion to detect a minute movement of a seated person such as Patent Document 4 (Japanese Patent Application Laid-open No. Hei 9-84656).

However, all of the technologies disclosed in the Patent Documents 1 to 3 are technologies applied to an ordinary urethane seat structured by placing an urethane material with a prescribed thickness on a seat spring (seat back spring, seat cushion spring). Accordingly, changing a sitting posture is to force a lumbar support, a side support, a front lifter, a rear lifter, a reclining device, etc., to move. When only the lumbar support or the side support is forced to move, a stimulus is leaned to a local area. This kind of unbalanced stimulus is effective at restoring awakenness rather than reducing fatigue, and when the local stimulus like this is maintained during a long period of driving, the feeling of fatigue is rather enhanced. Accordingly, Patent Document 1 copes with this disadvantage by forcing the movement of a lumbar support only when a prescribed length of elapsed time is detected.

In a structure to change a supporting face angle using a front lifter or a rear lifter as in the Patent Document 2, although no local stimulus like the above is not sensed, since angle change of a seat cushion or seat back is performed with an ordinary urethane seat, it is necessary to force not only a cushioning member (urethane) but also a cushion frame and a seat frame to move. The change of the supporting face angle is characterized by changing the supporting face angle while restraining deviation of the angle between the pelvis and the lumbar vertebra. Therefore, when the supporting face angle is changed, the angles of the back (vicinity of the lumbar vertebra) and the femur (vicinity of the pelvis) of the seated person to the horizontal surface also change, and no change occurs in the sitting posture itself. In other words, in the case of sitting with an extended back or in the case of sitting with round shoulders, the posture is kept as it is, and only the angles of the back and the femur to the horizontal surface change at the same angle. Therefore, in the technology described in the Patent Document 2, the sitting posture is substantially fixed, and a significant fatigue reduction effect cannot be expected.

On the other hand, in Patent Document 4, there is a description of a problem that with a mechanism to operate depending on a sitting period or to operate periodically, a seated person is forced to change a posture even when the seated person does not want to do it, which makes the seated person feel unpleasant. The Patent Document 4 is characterized by that when a seated person shows a body movement, the mechanism operates in a direction to promote the body movement. Body movement of the seated person's own accord is often seen when the feeling of fatigue or the like is elevated, and is excellent in view of effectively performing fatigue reduction. However, fatigue is naturally accumulated during no spontaneous body movement of a seated person. Therefore, it is preferable to have a structure possible to induce a posture change when a feeling of fatigue is raised, and at the same time possible to reduce accumulation of fatigue even when such a conscious fatigue feeling is not sensed, and possible to perform a minute posture change in a level that the seated person does not feel unpleasant.

The present invention is achieved from a view of the above-described problems, and an object thereof is to provide a seat structure which is able to change a supporting pressure not locally but over a wider area of a seat cushion or a seat back to stimulate blood stream and reduce fatigue, and is possible to minutely and surely perform sitting posture change without necessity of moving a cushion frame or a seat frame. In addition, it is also an object of the present invention to provide a seat structure which can temporarily restore awakeness when a degree of fatigue is raised or awakeness is lowered.

DISCLOSURE OF THE INVENTION

When solving the above-described problems, the present inventor paid attention to a seat having a structure of stretching a cushioning member such as a solid knitted fabric or the like across a cushion frame or a back frame, which is disclosed in Japanese Patent Application Laid-open No. 2003-182427 proposed by the present applicant. The seat differs from a conventional structure of placing a urethane member on a seat spring, but is a seat structured by stretching a cushioning member across frames, and has an advantage of having cushionability equal to or more than that of a urethane member with the prescribed thickness though it is thin, is excellent in air permeability and capable of reducing weight. Whereas, even for a seat prepared by being stretched across a cushion frame or a back frame, it is disclosed to provide various seat springs such as Plumaflex or the like on the back side of the cushioning member to enhance a sense of stroke, vibration absorption ability, impact absorption ability, and the like during seated. Then, the present inventor has accomplished the present invention by adopting a cloth spring as a seat spring, adjusting the tension of the cloth spring, and studying changes to the supporting pressure of the cushioning member. By taking this structure, it becomes possible to realize a slight sitting posture change due to occurrence of minute body movement without giving a local stimulus or pain to a human body, and since there is no necessity to move the cushion frame or back frame, it is possible to control a sitting posture with reliability even with a minute change but the sitting posture never gets fixed substantially as in the Patent Document 2. Moreover, since it is structured to provide a cloth spring and control its tension, it is possible to provide a seat structure without damaging a characteristic of a so-called lightweight seat prepared by stretching a solid knitted fabric or the like.

That is, an invention described herein provides a seat structure including a seat cushion having a cushioning member for a seat cushion stretched across a cushion frame, and a seat back having a cushioning member for a seat back stretched across a back frame, including:

at least one of a supporting pressure adjusting means for the seat cushion for changing a supporting pressure of the cushioning member for the seat cushion and a supporting pressure adjusting means for the seat back for changing a supporting pressure of the cushioning member for the seat back, in which the supporting pressure adjusting means for the seat cushion and the supporting pressure adjusting means for the seat back include:

a cloth spring provided on the back of the cushioning member for the seat cushion or the cushioning member for the seat back respectively and stretched across the cushion frame or the back frame; and a cloth spring adjusting member to adjust tension of the cloth spring, in which the cloth spring adjusting member adjusts the tension of the cloth spring to change the supporting pressure of the cushioning member for the seat cushion stretched across the cushion frame or the supporting pressure of the cushioning member for the seat back stretched across the back frame.

In one embodiment of the invention both of the supporting pressure adjusting means for the seat cushion and the supporting pressure adjusting means for the seat back are provided.

In one embodiment of the invention the cushioning member for the seat cushion stretched across the cushion frame and the cushioning member for the seat back stretched across the back frame are a solid knitted fabric knitted by reciprocating connecting yarn between a pair of ground knitted fabrics positioned at a prescribed distance or a stacked body of a solid knitted fabric and a urethane member.

Another embodiment of the invention provides seat structure, in which one end of the cloth spring composing the supporting pressure adjusting means for the seat cushion is disposed on the front of the cushion frame along the width direction and engaged with a movable frame pivotable in front and behind, and the other end is connected to the rear of the cushion frame, and in which the cloth spring adjusting member is structured such that it can pivot the movable frame in front and behind, and at least a portion of the cushioning member for the seat cushion is displaced in a direction protruding upward by pivoting the movable frame forward in the seated state to raise the supporting pressure.

Another embodiment of the invention provides seat structure, in which one end of the cloth spring provided on the back of the cushioning member for the seat back is disposed at the upper portion of the back frame along the width direction, and engaged with a movable frame pivotable in front and behind, and the other end of the cloth spring is connected to the lower portion of the back frame, and both side ends of the cloth spring are connected to side frames protruding more to the front of the upper portion of the back frame via a spring member, and biased in the direction pushed forward in the normal state by the spring member, and in which the cloth spring adjusting member is structured such that it can pivot the movable frame in front and behind, and at least a portion of the cushioning member for the seat back is displaced in a direction protruding forward by pivoting the movable frame forward in the seated state to raise the supporting pressure.

Another embodiment of the invention provides seat structure, in which the respective cloth spring adjusting members include: a motor; and a transmitting member provided between the motor and the movable frame, transmitting the drive of the motor to the movable frame, and pivoting the movable frame in front and behind.

Another embodiment of the invention provides seat structure, in which a displacement amount in front of and behind the movable frame pivoted by the supporting pressure adjusting means for the seat cushion is controlled in the range of 5 to 15 mm in a straight distance.

Another embodiment of the invention provides seat structure, in which a displacement amount in front of and behind the movable frame pivoted by the supporting pressure adjusting means for the seat back is controlled in the range of 10 to 20 mm in a straight distance.

Another embodiment of the invention provides seat structure, in which the respective spring adjusting members composing the supporting pressure adjusting means for the seat cushion or the supporting pressure adjusting means for the seat back are controlled to operate at prescribed time intervals respectively.

Another embodiment of the invention provides seat structure, in which the respective cloth spring adjusting members are controlled to operate at every prescribed time interval, during a prescribed operating period of time, and at a prescribed cycle respectively.

Another embodiment of the invention provides seat structure, in which the seat structure is structured to provide a sifting state determining mechanism to determine the state of at least one element out of the degree of fatigue and the degree of awakenness to perform drive controlling of at least one of the supporting pressure adjusting means for the seat cushion and the supporting pressure adjusting means for the seat back according to an output signal from the sitting state determining mechanism.

Another embodiment of the invention provides seat structure, further including a stimulus imparting means for enhancing the degree of awakenness of a seated person.

Another embodiment of the invention provides seat structure, in which the seat structure is structured to provide a sifting state determining mechanism to determine the state of at least one element out of the degree of fatigue and the degree of awakenness, and in which the stimulus imparting means works when at least one of the degree of fatigue and the degree of awakenness determined by the sitting state determining mechanism gets to prescribed degrees of fatigue or awakenness.

Another embodiment of the invention provides seat structure, in which the stimulus imparting means is a movable lumbar support mechanism provided movably at least in front and behind in the vicinity corresponding to the lumbar vertebra in the seat back.

(Explanation of Terms)

"cloth spring" can use a solid knitted fabric as well as a conventional two-dimensional net member (two-dimensional cloth) containing elastic yarn. As the solid knitted fabric (three-dimensional net member), a fabric knitted with, for example, a double Raschel knitting machine or the like, and structured by reciprocating connecting yarn between a pair of ground knitted fabrics positioned at a prescribed interval can be used.

"adjustment of the tension of a cloth spring" includes changing tension along the direction of stretching of the cloth spring (longitudinal direction for the seat cushion and vertical direction for the seat back), changing tension in the lateral direction, or in a direction substantially orthogonal or in a direction slanting at a prescribed angle to the surface of stretching, for instance, or further including to change a stretched position after adjusting with the cloth spring adjusting member so as to be different from the position before adjusting, by, for instance, elastic force of coil springs provided on both sides of the seat back. In other words, it is adoptable if it is a means to adjust tension by functioning the cloth spring not locally but as a whole, so that easiness of bending seat cushion or seat back can be varied during seated to cause a minute body movement, thereby causing a minute posture change.

"cushioning member for seat cushion" and "cushioning member for seat back" are stretched at low tension of 0% to 5% to a cushion frame or back frame. As a cushioning member for the seat cushion and a cushioning member for the seat back, a urethane material about 5 to 30 mm in thickness, a layered material of a solid knitted fabric and a thin urethane material other than a solid knitted material can be used. It is preferable to use a cushioning member containing a solid knitted fabric as at least one portion thereof since solid knitted fabric has excellent cushioning properties and air permeability even with the same thickness. Note that, the cushioning member for the seat cushion and the cushioning member for the seat back can be used serving also as an outer layer or it is adoptable to be a structure further layering an outer layering member such as a leather or the like.

(Function)

A seated person takes seat on a seat structure including a cushioning member (30) for the seat cushion stretched over a cushion frame (10) and a cushioning member (40) for the seat back stretched over a back frame (20). A cloth spring adjusting member (50) or (500) operates continuously or at prescribed operating time intervals. Then, tension of the cloth spring (31) (lower cloth spring (31*b*)) for the seat cushion or the cloth spring (41) for the seat back is adjusted so that a supporting pressure of at least one of the cushioning member (30) for the seat cushion and a cushioning member (40) for the seat back to a seated persons is changed in a wide area. Change of supporting pressure via the cloth spring (31) (lower cloth spring (31*b*)) or a cloth spring (41) causes a minute body movement to a seated person with reliability, thereby causing a minute change of a sitting posture, promoting a blood stream and contributing to fatigue reduction of a seated person. For instance, compared with a structure to give stimulus to a seated person with a lumbar support, since it is a mild change to a whole contacting surface with a seated person, there is no feeling of a partial feeling of something foreign or pain.

(Effect of Invention)

According to the invention, this is a structure stretching a cushioning member for the seat cushion and a cushioning member for the seat back across a cushion frame and a back frame, disposing a cloth spring as a seat spring on the back face of the cushioning member for the seat cushion and a cushioning member for the seat back, and providing a cloth spring adjusting member to adjust tension of the cloth spring. Accordingly, when tension of the cloth spring is adjusted by a cloth spring adjusting member, a supporting pressure of the cushioning member for the seat cushion and the cushioning member for the seat back to a human body changes in a wide area, and a minute posture change is brought to a seated person to contribute to fatigue reduction.

The cloth spring adjusting member may be structured to function continuously or at prescribed operational time intervals, or a sitting state determining mechanism to determine at least the state of one factor between a degree of fatigue and a degree of awakeness may be provided to operate when the degree of fatigue is raised or the degree of awakeness is lowered. When the sitting state determining mechanism is provided, since the supporting pressure adjusting means for the seat cushion and the supporting pressure adjusting means for the seat back can switch from a control mode to operate always continuously or at every prescribed operation time interval to a control mode to operate only when the degree of fatigue or the like is raised during driving, control according to a user's preference can be realized.

When structured to provide a stimulus imparting means other than a cloth, spring and a cloth spring adjusting member which serve as a supporting pressure adjusting means for the seat cushion and a supporting pressure adjusting means for the seat back to raise the degree of awakeness, it is possible to temporarily improve the degree of awakeness by operating at a time of lowering the degree of awakeness.

BRIEF DESCRIPTION OF DRAWINGS

FIG. 3 is a perspective view of a seat back for showing an embodiment of the present invention;

FIG. 4 is a view of a vertical cross section of a variation in the seat cushion for showing an embodiment of the present invention;

FIG. 10 is a view showing a test result of Test Example 3;

BEST MODE FOR CARRYING OUT THE INVENTION

Hereinafter, based on an embodiment of the present invention shown in drawings, the present invention will be explained further in detail. In the present embodiment, a seat structure adopted in a seat for a motor car will be explained.

Figure 1:
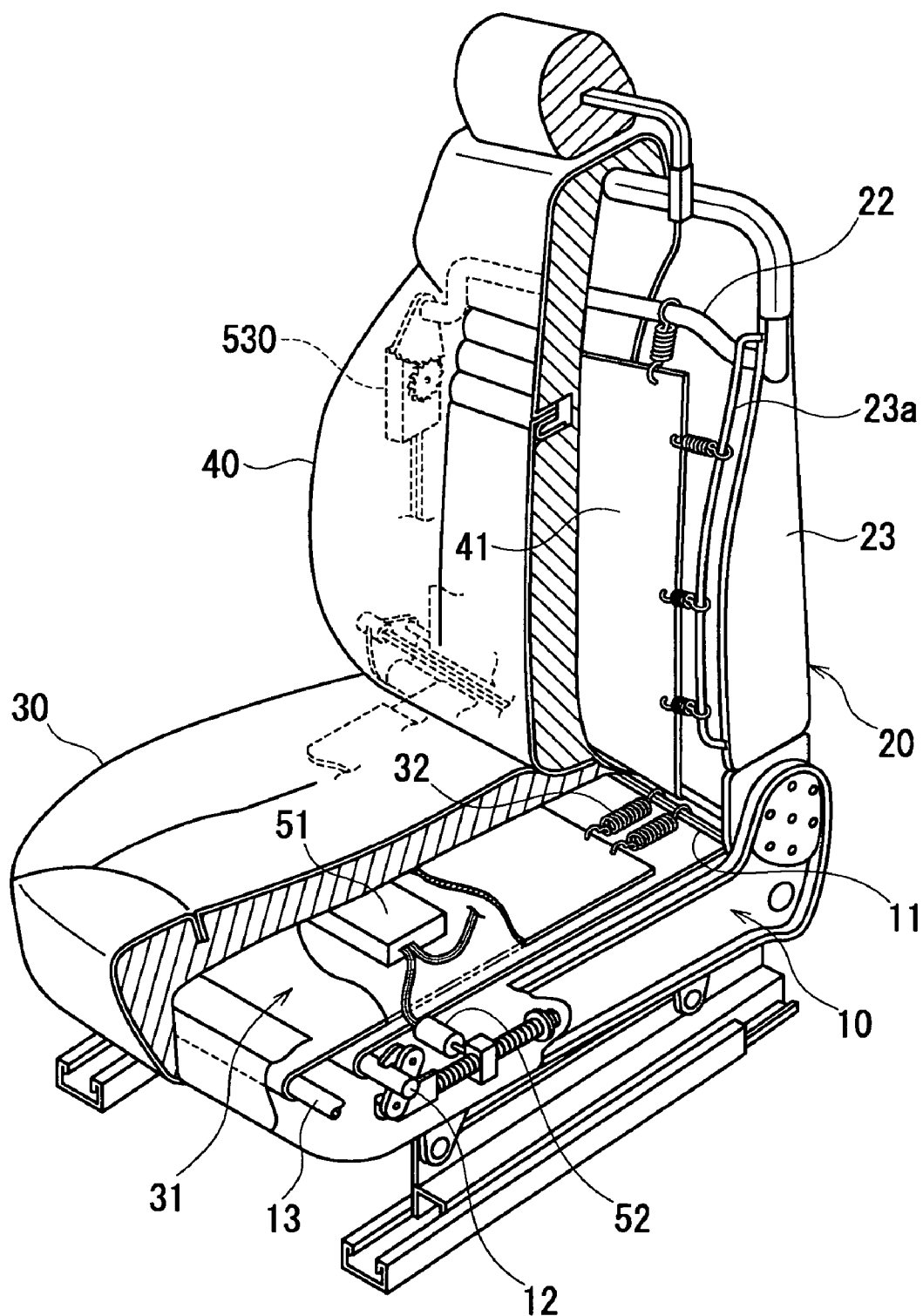
FIG. 1 is a general perspective view for showing an embodiment of the present invention.

As shown in FIG. 1, the present embodiment is a seat structure provided with a cushioning member (30) for the seat cushion stretched across a cushion frame (10), and a cushioning member (40) for the seat back stretched across a back frame (20).

(Structure of the Seat Cushion)

Figure 2:
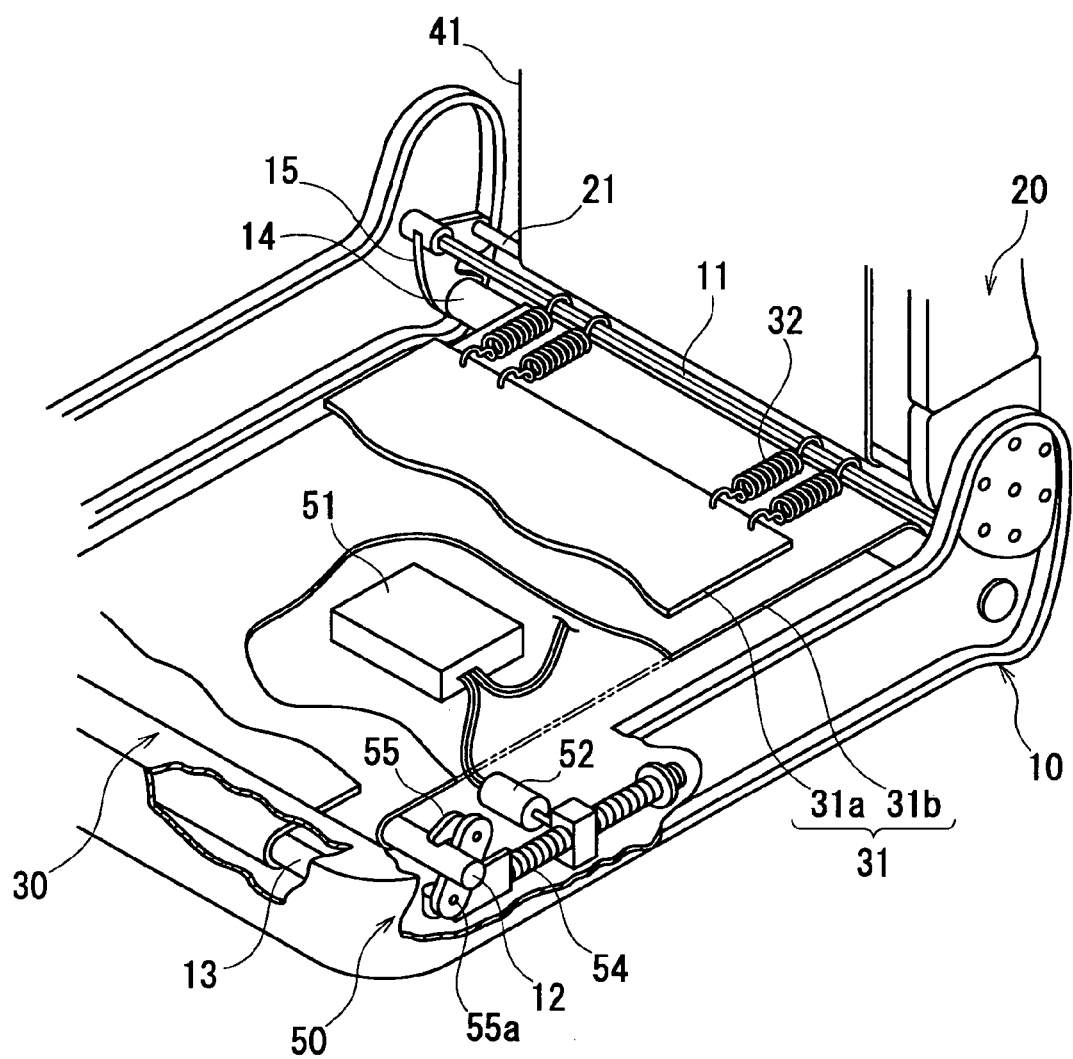
FIG. 2 is a perspective view of a seat cushion for showing an embodiment of the present invention.

As for the seat cushion, as shown in FIG. 2, the back side of the cushioning member (30) for the seat cushion is structured as follows. That is, the seat cushion includes: a torsion bar (11) horizontally hung on in the rear of the cushion frame (10); a rear end supporting frame (14) serving as a portion of the cushion frame (10), and hung on parallel to and downward from the torsion bar (11) via L-shaped arms (15) using both ends of the torsion bar (11) as a rotational center; a movable frame (12) horizontally and pivotably fixed on the front side of the cushion frame (10); a front end fixed frame (13) disposed in front of the movable frame (12) along the width direction and placed at the front edge of the seat cushion; and a cloth spring (31) being substantially a square in shape, and preferably having an area nearly equal to or greater than the area of the cushioning member (30) for the seat in contact with a seated person.

In the present embodiment, the cloth spring (31) has an upper cloth spring (31a) stretched across a suitable frame disposed in the rear end of the seat cushion and the front end fixed frame (13), and a lower cloth spring (31b) stretched across the rear end supporting frame (14) and the movable frame (12). The end at the rear of the upper cloth spring (31a) is hung on the torsion bar (11) via a plurality of metal coil springs (32), thereby ensuring stroke during seated. Although the coil springs (32) are directly engaged with the torsion bar (11) in FIG. 2, it is also adoptable, for instance, to dispose the torsion bar (11) by inserting it in a pipe-shaped frame so that the coil springs (32) are engaged with the pipe-shaped frame, not directly engaged with the torsion bar (11). It is also possible to engage the coil springs with other arbitrary frame of the cushion frame (10). The lower cloth spring (31b) is connected to the movable frame (12) on the front side and to the rear end supporting frame (14) on the rear side (rear end), and "a cloth spring to be adjusted in tension" defined herein corresponds to the lower cloth spring (31b) in the seat cushion of the present embodiment. Since the lower cloth spring (31b) is provided in this manner, elastic force of the torsion bar (11) functions via the L-shaped arms (15) supporting the rear end supporting frame (14). It is structured that tension of the lower cloth spring (31b) is adjusted by a cloth spring adjusting member (50) which will be described later, and "a supporting pressure adjusting means" defined herein is structured with the lower cloth spring (31b) and the cloth spring adjusting member (50) in the present embodiment. Note that though the lower cloth spring (31b) is elastically supported to the cushion frame (10) by the torsion bar (11) in the present embodiment, it is possible to support the lower cloth spring (31b) using coil springs instead of or together with the torsion bar (11).

The cloth spring (31) can be disposed without using a coil spring or a torsion bar according to the elastic force. Another spring member can be used instead of the metal spring such as a coil spring or a torsion bar or these members can be suitably combined. The choice should be made in consideration of the position of a spring member to be used such as a metal spring or the like, ease of disposition at the position of usage, whether it makes a person feel something foreign, and the like.

Although in the present embodiment, the cloth spring (31) is constituted with two sheets of the upper cloth spring (31a) and the lower cloth spring (31b), it is possible to constitute it with one sheet of the lower cloth spring (31b) without using the upper cloth spring (31a) so far as the supporting pressure of the cushioning member (30) for the seat cushion can be changed. However, in order to ensure the stroke while seated and reduce a feeling of bottom touch, it is preferable to dispose two sheets in this manner.

Figure 5:
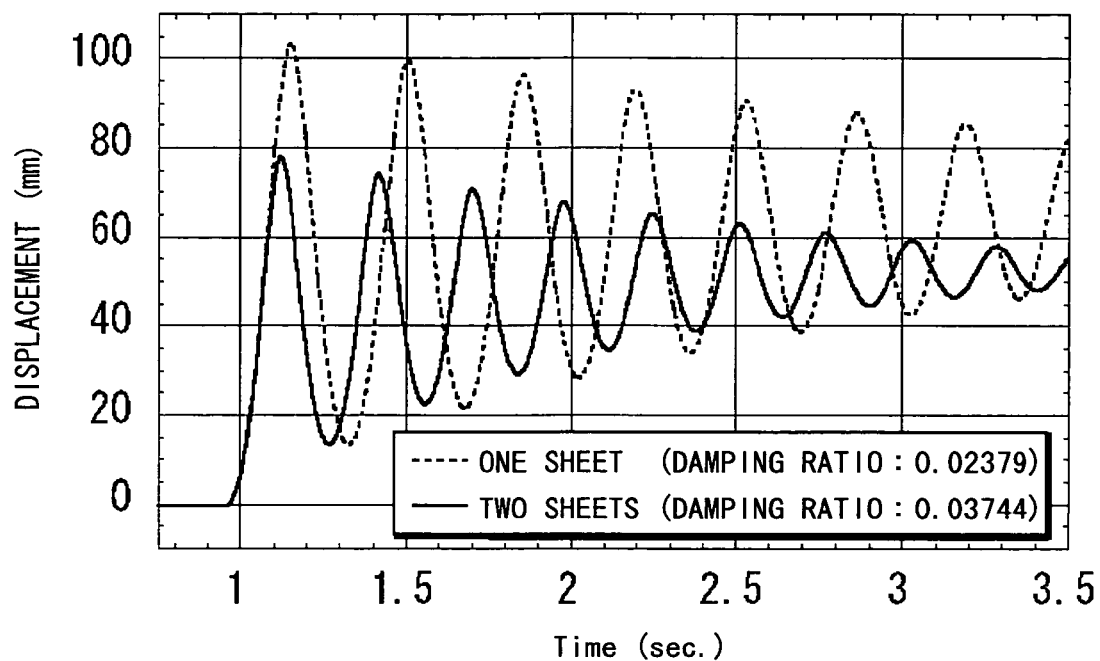
FIG. 5 is a graph showing changes of damping characteristics together with differences in the number of cloth springs.

FIG. 5 shows changes of damping characteristics together with differences in the number of cloth springs. This figure is obtained as follows. In a first case of disposing the lower cloth spring (31b) (one sheet of the cloth spring), and a second case of disposing the upper cloth spring (31a) on the lower cloth spring (31b) (two sheets of the cloth springs) as shown in FIG. 2, a buttock-shaped pressure disk (50 kg) is dropped freely from a position contacting with the lower cloth spring (31b) for the case of one sheet of the cloth spring, and from a position contacting with the upper cloth spring (31a) for the case of two sheets of the cloth spring, and the displacement amount to the elapsed time is measured to determine the damping ratio. Then, it is found that the damping ratio which is 0.02379 for the case of one sheet of the cloth spring becomes 0.03774 for the case of two sheets of the cloth springs. Therefore, it is considered that the case of two sheets is superior in the damping characteristic.

(Supporting Pressure Adjustment for Seat Cushion)

The cloth spring adjusting member (50) for seat cushion makes the movable frame (12) move to adjust the tension of the lower cloth spring (31b) so as to adjust the supporting pressure of the cushioning member (30) for the seat cushion.

Figure 6:
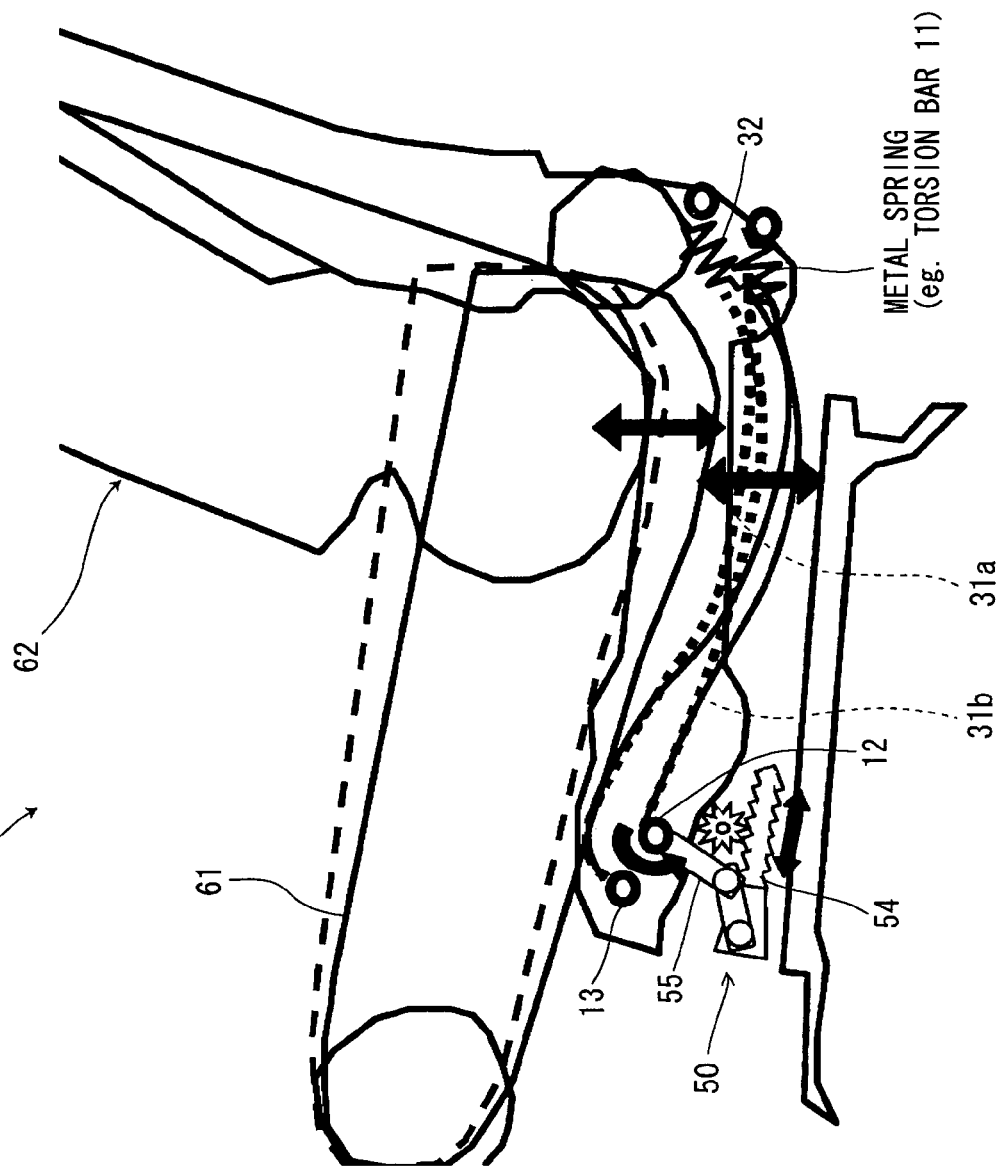
FIG. 6 is a sectional view of a seat cushion for showing an embodiment of the present invention together with a seated person.

As shown in FIGS. 1, 2 and 4, the cloth spring adjusting member (50) includes a motor (52) to be a power source, an advancing and retreating gear (54) to advance and retreat forward and backward of the seat cushion with the rotation of the motor (52), and a link (55) pivotally supported by a link pin (55a) at the forward side end of the advancing and retreating gear (54), and at the same time, holding the end of the movable frame (12). Traveling in the advancing and retreating direction of the advancing and retreating gear (54) serves to change a rest position of the movable frame (12) with pivoting of the link (55) around the link pin (55a). As a result, the position of the rear end supporting frame (14) is changed, and the tension of the lower cloth spring (31b) is changed. This is because both ends of the rear end supporting frame (14) are fixed to the L-shaped arms (15), which are able to pivot around the positions of both ends of the torsion bar (11). As a result, due to the elastic force of the torsion bar (11), for instance, the advancing and retreating gear (54) retreats, so that the movable frame (12) pivots forward. Then, the lower cloth spring (31b) is wound in forward, making the tension strong, so that the lower cloth spring (31b) moves from the position depicted by a solid line to the position depicted by a broken line in FIGS. 4 and 6, especially the vicinity corresponding to the buttocks portion is raised, which makes the supporting pressure of the cushioning member (30) for the seat cushion is raised via the upper cloth spring (31a). Under such conditions, when the advancing and retreating gear (54) advances, and the movable frame (12) pivots in the reverse direction, the tension of the lower cloth spring (31b) is relaxed, and the lower cloth spring (31b) descends from the broken line position to the solid line position in reverse to the direction described above. Accordingly, as shown in FIG. 6, in a seat structure provided with two sheets of cloth springs (31a, 31b), the supporting pressure changes depending on looseness or strain of the tension in a stretching direction (longitudinal direction) of the lower cloth spring (31b) disposed underneath. Therefore, since the easiness of bending during seated is changed, the position of the femur (61) of a seated person (60) changes (the state that the supporting pressure is raised because the cushioning member (30) for the seat cushion is pressed by the cloth springs (31a, 31b) is expressed by a broken line, and the state that the supporting pressure is lowered is expressed by a solid line).

It should be noted that the controlling or stopping of the rotation or the like of the motor (52) is performed by an outputting signal from a control box (51) connected to the motor (52). The cloth spring adjusting member (50) such as the motor (52), the control box (51), or the like is disposed below the lower cloth spring (31b) at a position so as not to be in the way and not to be felt as something foreign to a seated human body.

(Structure of the Seat Back)

As for the seat back, as shown in FIG. 3, the back side of the cushioning member (40) for the seat back is structured as follows. That is, the seat back includes: a horizontal frame (21) horizontally laid across below the back frame (20); a double-crank shaped movable frame (22) disposed horizontally and pivotably above the back frame (20); spring supporting frames (23a) disposed in the vertical direction on both side frame main bodies (23) of the back frame (20) respectively, and formed substantially U-shaped as seen from the side so as to protrude further forward than the upper portion of the back frame (20); a cloth spring (41) being substantially a square in shape, and preferably having an area nearly equal to or greater than the area of the cushioning member (40) for the seat back in contact with a seated person; coil springs (42) stretched between the cloth spring (41) and the movable frame (22), and between the cloth spring (41) and the spring supporting frames (23); and the cloth spring adjusting member (500) for the seat back adjusting the tension of the cloth spring (41). Note that the coil spring (42) corresponds to the "spring member" defined by Claim 5, but it is possible to use other spring members not limited to metal coil springs so far as they have the same functions.

In the present embodiment, the "supporting pressure adjusting means for the seat back" defined herein includes the cloth spring (41) and the cloth spring adjusting member (500). Although the "side frame" defined herein includes the side frame main bodies (23) and the spring supporting frames (23a), it is possible to form the side frame with only the side frame main bodies (23) without using the exclusive spring supporting frames (23a) like in the present embodiment so far as a portion protruding forward to the upper portion of the back frame (20) exists.

The horizontal frame (21) is connected to the ends of the shorter side portion positioned on the upper portion of the L-shaped arms (15) supported by the torsion bar (11). As described above, the movable frame (12) disposed toward the front of the seat cushion moves in front and behind by the cloth spring adjusting member (50) for the seat cushion. Through this movement, the rear end supporting frame (14) supported by the lower end portions of the longer side portions of the L-shaped arms (15) also pivots in front and behind. As a result, the horizontal frame (21) connected to the shorter side portions positioned on the upper portions of the L-shaped arms (15) pivot vertically. However, since the horizontal arm (21) pivots around the torsion bar (11) positioned at the intersections of the longer side portions and the shorter side portions of the L-shaped arms (15), when pivoting downward, it moves forward a little, and when pivoting upward, it moves backward a little. Accordingly, especially the vicinity of the lower portion of the cloth spring (41) for the seat back operates together with the movement of the lower cloth spring (31b) for the seat cushion, and the horizontal frame (21) follows in front and behind though the amount of movement is small. By structuring the cloth spring (41) to follow the movement of the lower cloth spring (31b) as above, supportability in the vicinity from the buttocks to the waist is enhanced when compared with the case of not following, and vibration absorbability is especially enhanced. Needless to say, by giving other vibration absorbing measures, for instance, it is possible to fixedly connect the horizontal frame (21) between lower portions of the side frame main bodies (23) of the back frame (20), not to the L-shaped arms (15) of the horizontal frame (21). The reason is that since the amount of pushing out (amount of horizontal movement) by the lower portion of the cloth spring (41) is slight even when the horizontal frame (21) connects to the L-shaped arms (15) as described above, it would not significantly affect the supporting pressure adjusting function of the cloth spring (41) by the cloth spring adjusting member (500). It is preferable to structure the horizontal frame (21) so as to connect to the L-shaped arms (15) as in the present embodiment, because it can execute also the vibration absorbing measure as described above.

(Supporting Pressure Adjustment for Seat Back)

The upper portion of the cloth spring (41) connects, via the coil springs (42) to the movable frame (22) disposed to be bulging upward and pivotable. The device to pivot this movable frame (22) forward or backward is the cloth spring adjusting member (500) for the seat back.

The cloth spring adjusting member (500) includes a motor (530) to be a power source, a power transmission gear (560) rotating with the rotation of the motor (530), and a fan-shaped transmission gear (570) which engages with the power transmission gear (560) and is fixed to the movable frame (22) to pivot together with the movable frame (22). Control of rotation or stop rotation of the motor (530) or the like can be performed also, for instance, with the control box (51) of the cloth spring adjusting member (50) for the seat cushion.

Figure 7:
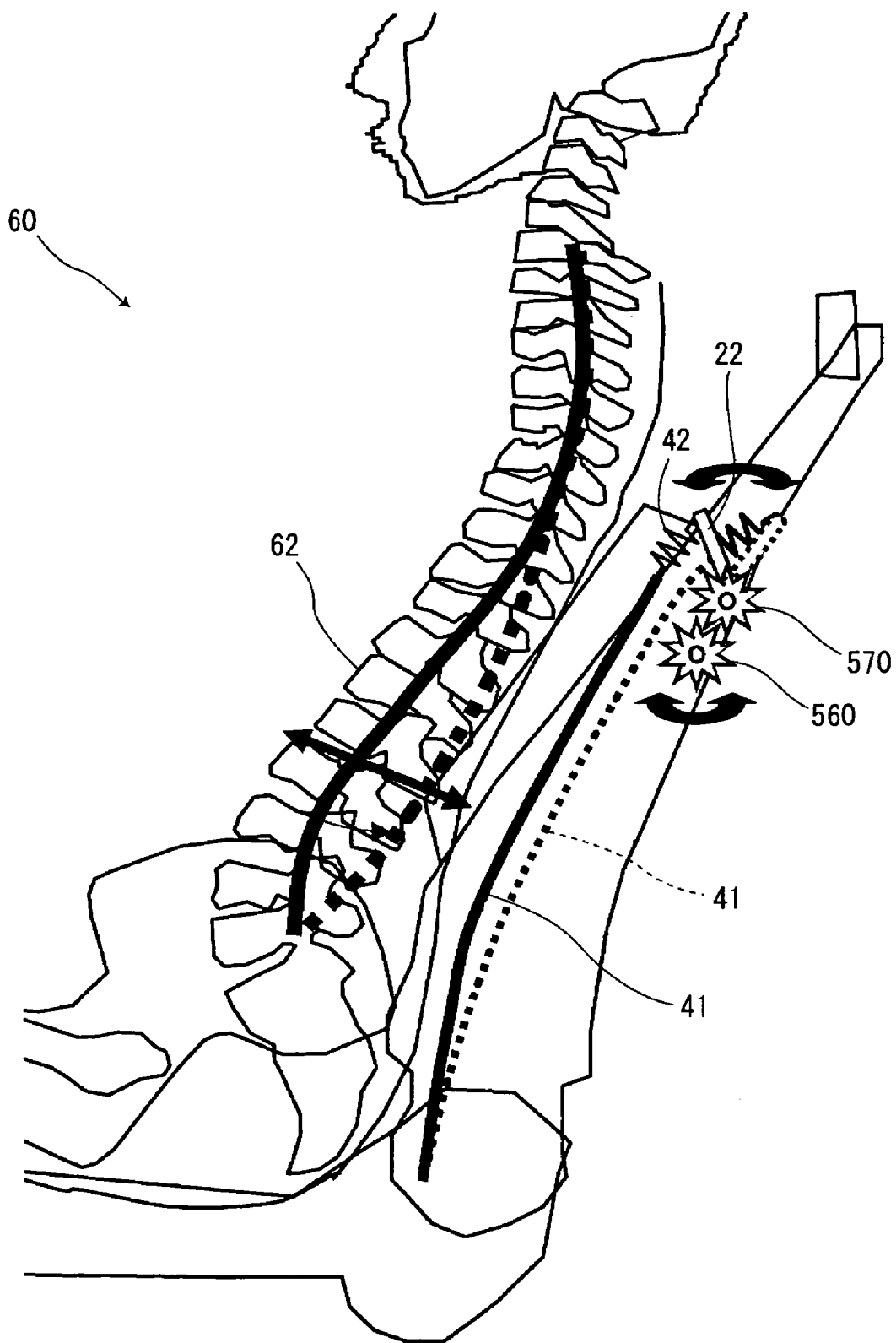
FIG. 7 is a sectional view of a seat back for showing an embodiment of the present invention together with a seated person.

When the motor (530) rotates, the power transmission gear (560) pivots, so that the transmission gear (570) engaged with the power transmission gear (560) pivots around the end portion of the movable frame (22). Since the transmission gear (570) is fixed to the movable frame (22), the movable frame (22) pivots. Since the movable frame (22) has a double-crank shape, the horizontal portion thereof to be hung with the coil springs (42) pivots in front and behind. At this time, the mid portion of the cloth spring (41) in the vertical direction is urged forward. Accordingly, when the movable frame (22) pivots forward, the degree of tension (position to be stretched or a side shape) is varied as if the cloth spring (41) is pushed forward by the coil springs (42). Accordingly, when, for instant, the movable arms (22) pivot forward (to the front side), the cloth spring (41) moves forward as a whole. In particular, a portion to be engaged with the coil springs (42) moves forward to take a shape shown by a solid line in FIG. 7, and pushes the cushioning member (40) for the seat back in the forward direction to enhance the supporting pressure of the cushioning member (40) for the seat back so that the cushioning member (40) for the seat back becomes difficult to bend, and results in a shape change to supplement formation of an S-shaped curve of the spine of a seated person. On the other hand, when the movable arms (22) pivot in the reverse direction, the cloth spring (41) moves backward against the elastic force of the coil springs (42) disposed right and left as shown by a broken line in FIG. 7 to change the degree of tension (position to be stretched or a side shape), and the cushioning member (40) for the seat back becomes easy to be bent to move backward under the load of a seated person.

According to the present embodiment, since the cloth spring (31) (lower cloth spring (31b)) having a prescribed size and forming a supporting pressure adjusting means for the seat cushion, and the cloth spring (41) having a prescribed size and forming a supporting pressure adjusting means for the seat back are used, the supporting pressure can be changed without giving a feeling of something foreign to a human body by partially protruding, so that moderate as a whole and minute body movement or posture transformation can be achieved.

It should be noted that although a motor, various gear members, linking member, and the like are used as cloth spring adjusting members in the present embodiment, the latter are not limited to those so far as they can adjust the tension of the cloth spring.

TEST EXAMPLE 1

The seat structure shown in the above embodiment is fixed on a mono-axial vibration tester, a testee was allowed to sit, and the ratio of bloodstreams are evaluated for the case of operating the supporting pressure adjusting means for the seat cushion and the supporting pressure adjusting means for the seat back (under control) and for the case of not operating (no control). The test was carried out by setting vibration frequencies of the mono-axial vibration tester at 4 Hz, 5 Hz, 6 Hz, and 10 Hz, and by vibrating all cases at the amplitude between the upper peak and the lower peak: 2 mm (one side amplitude: 1 mm).

The ratio of bloodstream was obtained by measuring finger tip volume pulse wave with an optical finger tip pulse wave meter and by calculating the ratio between the amount of bloodstream obtained under the exciting state and the amount of bloodstream collected under the resting state without excitation (exciting state/resting state), and the ratios thus obtained were compared.

For the case of "under control", the amount of horizontal movement of the movable frame (12) owing to the cloth spring adjusting member (50) of the supporting pressure adjusting means for the seat cushion was set to be 20 mm in a straight distance, and the amount of pivoting in front of and behind the movable frame (22) owing to the cloth spring adjusting member (500) of the supporting pressure adjusting means for seat back was set to be 30 mm in a straight distance, and the cloth spring adjusting means were operated continuously. During operation time, the movable frame (12) was set to operate at a cycle of 0.16 Hz for the seat cushion, and the movable frame (22) was set to operate at a cycle of 0.10 Hz for the seat back.

Figure 8:
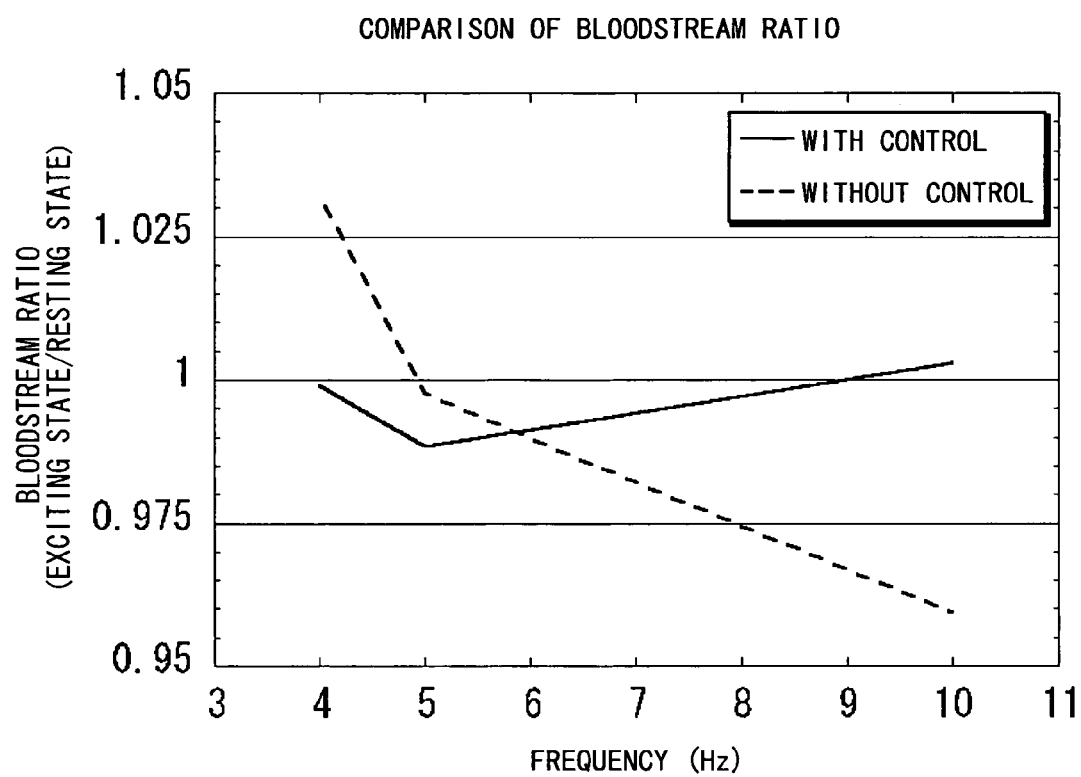
FIG. 8 is a view showing a test result of Test Example 1.

The result is shown in FIG. 8.

As clear from FIG. 8, it is found that in the case of "under control", the bloodstream ratio is close to 1 at all frequencies and the bloodstream values approximate to the resting state where no car moves can be maintained. From this fact, it is understood that the fluctuation control of the supporting pressure by the supporting pressure adjusting means for the seat cushion and the supporting pressure adjusting means for the seat back can help the bloodstream and promote metabolism. Although it is expected to obtain more favorable results in view of promotion of blood circulation and metabolism than in the case of "no control", even with either one of the supporting pressure adjusting means for the seat cushion or the supporting pressure adjusting means for the seat back. However, it is preferable for reducing the feeling of something foreign to a seated person to make both means function.

TEST EXAMPLE 2

In order to determine the suitable amount of displacement (straight distance), the suitable operational interval, the movement control method of the movable frames (12), (22), by the supporting pressure adjusting means for the seat cushion and the supporting pressure adjusting means for the seat back, a sitting experiment under the statically sitting state was carried out to compare the degree of fatigue by varying the amount of displacement, the operational interval, and the movement control method. The test conditions are as follows.

(1) Test Conditions

Amount of displacement (straight distance)

A: Cushion (movable frame (12)) ... 20 mm, back (movable frame (22)) ... 30 mm

B: Cushion (movable frame (12)) ... 10 mm, back (movable frame (22)) ... 15 mm

Operational interval a: 3 min. (repetition: 3 min. operation and 3 min. suspension)

b: 15 min. (repetition: 15 min. operation and 15 min. suspension)

c: Continuous operation

Movement control method

P: Cycle

P 1: In the case of displacement amount condition A
   Cushion (movable frame (12)) ... 0.016 Hz
   Back (movable frame (22)) ... 0.010 Hz P 2: In the case of displacement amount condition B
   Cushion (movable frame (12)) ... 0.032 Hz
   Back (movable frame (22)) ... 0.020 Hz Q: Chaos Control (2) Degree of Fatigue The degree of fatigue is calculated using a means proposed in Japanese Patent Application No. 2003-363902 by the present applicant. This calculation is carried out as follows. A finger tip volume pulse wave is measured by an optical finger tip pulse wave meter, the peak values in each cycle of an original waveform of time series data of the obtained finger tip volume pulse wave are detected, the difference between a peak value on the upper limit side and a peak value on the lower limit side for every prescribed time period is calculated from the respective peak values thus obtained, and the difference is set as a peak power value. An inclination of the power values to the time base during the prescribed time period is determined by slide calculating the prescribed times at a prescribed lap rate for the prescribed time period. Then, the integral value is determined by absolute value treatment of the inclination of the power values, which is taken as the degree of fatigue. Since a correlation between the integral value and a sensory evaluation is recognized, it is used as the degree of fatigue.

Figure 9A:
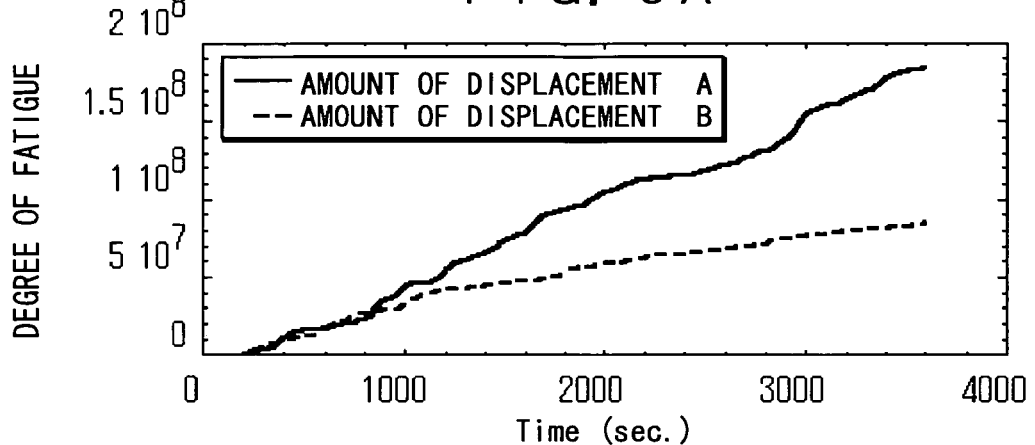
FIGS. 9 A to 9C are views showing a test result of Test Example 2.
Figure 9B:
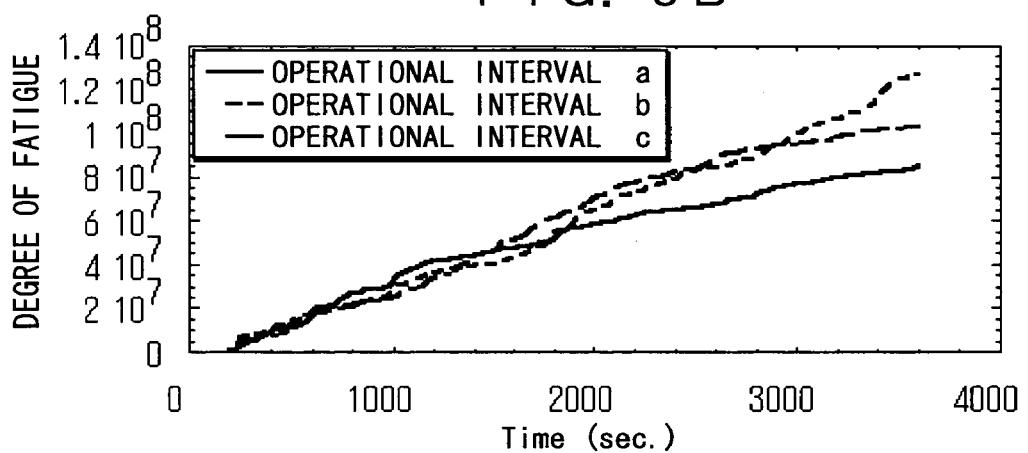
Figure 9C:
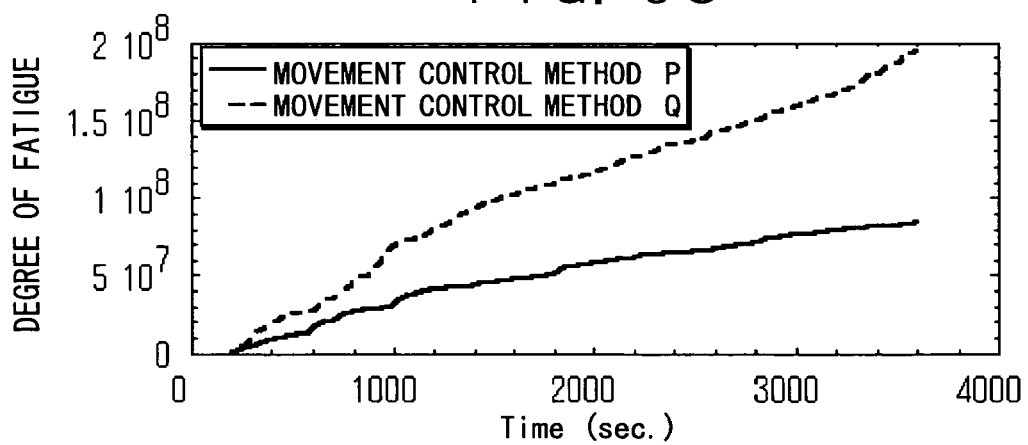

FIGS. 9A, 9B, and 9C show the result of the test example 2.

FIG. 9A shows the result of a measurement carried out under the following conditions of varying only the displacement amount between condition A and condition B, the operational interval to be the condition a, and the movement control method to be the conditions P1 and P2 respectively (since the amount of motor rotation is fixed, when the displacement amount is varied, the movable cycle fluctuates). The result shows that increase of the degree of fatigue is smaller in the case of the displacement amount B. FIG. 9B shows the result of a measurement carried out under the following conditions of varying only the operational interval between the conditions a and b, the displacement amount to be the condition B, and the movement control method to be the condition P2. The result shows that the condition a for the operational interval is superior. FIG. 9C shows the result of a measurement carried out under the following conditions of varying only the movement control method between P (P2) and Q, the displacement amount to be the condition B, and the operational interval to be the condition a. The result shows that the condition P for the movement control method is superior.

From the above results, it is found that the combination of the following conditions: displacement amount B: cushion (movable frame (12)) ... 10 mm, back (movable frame (22)) ... 15 mm, operational interval a: 3 min. (repetition: 3 min. operation and 3 min. suspension), movement control method P (P2): fixed cycle (cushion (movable frame (12)) ...

0.32 Hz, back (movable frame (22)) . . . 0.20 Hz) is most effective for reduction of fatigue.

That is, it can be said that operating the supporting pressure adjusting means with a small displacement amount, not giving a large stimulus change such as massage, promotes breathing and body motion, and the promotion of blood circulation and metabolism is high. Although the displacement amount differs according to a vehicle type or the like on which the present seat structure is installed, since a large displacement amount reduces the fatigue reduction effect when referring to the above-described result, it is preferable to set to be within ±5 mm of the above-described result, that is, within 5 to 15 mm for the cushion (movable frame (12)), and within 10 to 20 mm for the back (movable frame (22)). Since the cycle of human breathing is about 0.25 Hz or so, the operational cycle is preferably set within ±0.15 Hz of breathing cycle, namely, 0.1 to 0.4 Hz.

TEST EXAMPLE 3

A long-sitting fatigue test for one hour was carried out with highway driving for the case of controlling by the supporting pressure adjusting means for the seat cushion and the supporting pressure adjusting means for the seat back under the best suited control condition obtained in test example 2 and for the case of no control. A testee was seated on a passenger seat, and the degree of fatigue was measured for the cases of driving with and without control at the same time on different days on the same section.

The result is shown in FIG. 10.

As shown in FIG. 10, in the case of "without control", the degree of fatigue keeps increasing at a fixed inclination as time elapses. On the other hand, in the case of "with control" it is seen that the inclination of the fatigue becomes smaller after 1200 sec. Accordingly, in the case of "with control", this seat structure is especially suited to a long driving, and has an effect to reduce fatigue accumulation caused by a long driving.

Although in the above-described experiment, control by the supporting pressure adjusting means for the seat cushion and the supporting pressure adjusting means for the seat back is continuously performed during the test in the case of "with control", it is possible in an actual driving to set not to operate the supporting pressure adjusting means for the seat cushion and the supporting pressure adjusting means for the seat back at the beginning of driving, and automatically operate these supporting pressure adjusting means when the degree of fatigue reaches or exceeds the prescribed value. Even by such a setting, it is possible to reduce increase of the degree of fatigue after driving. It is also possible to constitute the seat structure by setting a control mode to operate the supporting pressure adjusting means for the seat cushion and the supporting pressure adjusting means for the seat back continuously or at prescribed intervals during driving and a control mode to operate them only when the degree of fatigue arrives at the prescribed value or greater, and to be able to switch between the modes by an attendant.

Detection of the degree of fatigue can be performed by installing, in a seat structure, a sitting state determining mechanism including the above-described optical finger tip pulse wave meter and a calculating means (computer) performing calculation of the degree of fatigue by a means to be proposed in the above-described Japanese Patent Application No. 2003-363902 using the pulse wave thus obtained. Since a means proposed in Japanese Patent Application No. 2003-363902 can also detect the degree of fatigue by a living body signal other than the finger tip volume pulse wave, it is possible to constitute to collect pulse wave using a well known measurement device to collect an earlobe pulse wave, or a piezoelectric film attached to the cushioning member for the seat cushion or the cushioning member for the seat back as well as the optical finger tip pulse wave meter. It should be noted that a sitting state determining mechanism is not limited to this means, for instance, a means such as to determine from a brain wave or the like can be used, so far as it can measure at least either degree of fatigue or degree of awakeness. Note that the term "degree of awakeness" is a measure showing a level of awakening, which can obtain by, for instance, analyzing a brain wave and obtaining from a distribution rate of the a wave.

(Addition of Stimulus Imparting Means)

In the above embodiment, the supporting pressures of the cushioning member for the seat cushion and the cushioning member for the seat back formed from the solid knitted fabric or the like stretched across the cushion frame and the back frame are adjusted by the supporting pressure adjusting means for the seat cushion and the supporting pressure adjusting means for the seat back having a cloth spring thereby providing a seat structure causing a low degree of fatigue. However, even with a seat structure causing a low degree of fatigue, the degree of awakeness gradually lowers due to the long driving time. Therefore, it is preferable to add a structure to give a stimulus perceivable to a seated person to the above-described seat structure when the degree of fatigue becomes a prescribed value or greater, or the degree of awakeness becomes a prescribed value or smaller by a sitting state determining mechanism. Through this structure, since the degree of awakeness is temporarily enhanced, it becomes possible to forcibly awaken temporarily, when, for instance, drowsiness is increased due to fatigue, so that consciousness to a resting place can be ensured.

As a stimulus imparting means, for instance, a mechanism to fluctuate a lumbar support disposed separately from the cloth spring (41) in front and behind with a relatively great displacement amount can be adopted. As the lumbar support, a structure constituted with a substantially rectangular plate-like body and a moving mechanism which can move the plate-like body in front and behind, so as to impart a local pressing stimulus to the waist by moving the structure forward can be cited. As for a positional relation with the cloth spring (41), it may be disposed on the back or on the front surface of the cloth spring so far as it does not disturb movement of the cloth spring (41). When the stimulus imparting means is operated at all time, the stimulus felt by a human body is too strong, and therefore, it is not suited for long driving, and it cannot make the best use of low fatigue which is the characteristic of the present invention. Accordingly, it is recommendable to have a structure in which a sitting state determining mechanism is provided and when the degree of fatigue or awakeness arrives at a prescribed reference value, the stimulus imparting means is operated. During operating of the stimulus imparting means, the supporting pressure adjusting means for the seat cushion or the supporting pressure adjusting means for the seat back may be operated or may be stopped. The stimulus imparting means can be structured to operate at any time when a crew becomes conscious of drowsiness. Note that the stimulus imparting means is not limited to the above described movable lumbar supporting mechanism, but may be a means to stimulate by pressing the femur or both side portions.

INDUSTRIAL AVAILABILITY

The present invention can be applied to various vehicle seats such as a train, a plane, and the like, an office chair or the like as well as a car seat.

The invention claimed is:

1. A seat structure including a seat cushion having a cushioning member for a seat cushion stretched across a cushion frame, and a seat back having a cushioning member for the a seat back stretched across a back frame, comprising:
   at least one of a supporting pressure adjusting means for the seat cushion for changing a supporting pressure of the cushioning member for the seat cushion and a supporting pressure adjusting means for the seat back for changing a supporting pressure of the cushioning member for the seat back,
   wherein said supporting pressure adjusting means for the seat cushion and said supporting pressure adjusting means for the seat back comprises:
   a cloth spring provided on the back of the cushioning member for the seat cushion or the cushioning member for the seat back respectively and stretched across the cushion frame or the back frame; and
   a cloth spring adjusting member to adjust tension of said cloth spring,
   wherein said cloth spring adjusting member adjusts the tension of said cloth spring to change the supporting pressure of the cushioning member for the seat cushion stretched across the cushion frame or the supporting pressure of the cushioning member for the seat back stretched across the back frame;
   a movable frame fixed horizontally and being pivotable forward and backward on the front of the cushion frame, and engaging with said cloth spring;
   a torsion bar horizontally hung on in the rear of the cushion frame;
   a L-shaped arm rotatable using both ends of the torsion bar as a rotational center; and
   a rear end supporting frame hung on parallel to and downward from the torsion bar via the L-shaped arms supporting the rear end supporting frame, the rear end supporting frame serving as a portion of the cushion frame and connected with said cloth spring,
   wherein one end of said cloth spring composing said supporting pressure adjusting means for the seat cushion is disposed on the a front of the cushion frame along a width direction and engaged with the movable frame pivotable forward and backward, and the other end of said cloth spring is connected to the rear end supporting frame; and
   wherein said cloth spring adjusting member is structured such that it can pivot the movable frame forward and backward so that the movable frame displaces the rear end supporting frame and the tension of said cloth spring variably, and at least a portion of the cushioning member for the seat cushion is displaced in a direction protruding upward by pivoting the movable frame forward in a seated state to raise the supporting pressure.

2. The seat structure according to claim 1, comprising:
   both of said supporting pressure adjusting means for the seat cushion and said supporting pressure adjusting means for the seat back.

3. The seat structure according to claim 1, wherein said cushioning member for the seat cushion stretched across the cushion frame and said cushioning member for the seat back stretched across the back frame are a solid knitted fabric knitted by reciprocating connecting yarn between a pair of ground knitted fabrics positioned at a prescribed distance or a stacked body of a solid knitted fabric and a urethane member.

4. The seat structure according to claim 1,
   wherein one end of said cloth spring provided on the back of the cushioning member for the seat back is disposed at an upper portion of the back frame along a width direction, and engaged with a movable frame pivotable forward and backward, and the other end of said cloth spring is connected to a lower portion of the back frame, and both side ends of said cloth spring are connected to side frames protruding more to the front from the upper portion of the back frame via a spring member, and biased in a direction pushed forward in a normal state by the spring member; and
   wherein said cloth spring adjusting member is structured such that it can pivot the movable frame forward and backward, and at least a portion of the cushioning member for the seat back is displaced in a direction protruding forward by pivoting the movable frame forward in the seated state to raise the supporting pressure.

5. The seat structure according to claim 1, wherein said respective cloth spring adjusting members comprise:
   a motor; and
   a transmitting member provided between the motor and the movable frame, transmitting the drive of the motor to the movable frame, and pivoting the movable frame forward and backward.

6. The seat structure according to claim 1, wherein a displacement amount forward and backward of the movable frame pivoting by said supporting pressure adjusting means for the seat cushion is controlled in the range of 5 to 15 mm in a straight distance.

7. The seat structure according to claim 1, wherein a displacement amount forward and backward of the movable frame pivoted by said supporting pressure adjusting means for the seat back is controlled in the range of 10 to 20 mm in a straight distance.

8. The seat structure according to claim 1, wherein at least one of said cloth spring adjusting members composing said supporting pressure adjusting means for the seat cushion or said supporting pressure adjusting means for the seat back is controlled to operate at every prescribed time interval.

9. The seat structure according to claim 8, wherein at least one of said cloth spring adjusting members is controlled to operate at every prescribed time interval, during a prescribed operating period of time, and at a prescribed cycle.

10. The seat structure according to claim 1, wherein the seat structure comprises a sitting state determining mechanism to determine a state of at least one element out of a degree of fatigue and a degree of awakenness to perform drive controlling of at least one of said supporting pressure adjusting means for the seat cushion and said supporting pressure adjusting means for the seat back according to an output signal from the sitting state determining mechanism.

11. The seat structure according to claim 1, further comprising a stimulus imparting means for enhancing a degree of awakenness of a seated person.

12. The seat structure according to claim 11,
   wherein the seat structure comprises a sitting state determining mechanism to determine a state of at least one element out of the degree of fatigue and the degree of awakenness; and
   wherein said stimulus imparting means operates when at least one of the degree of fatigue and the degree of awakenness determined by said sifting state determining mechanism arrives at a prescribed degree of fatigue or awakenness.

13. The seat structure according to claim 11, wherein the stimulus imparting means is a movable lumbar support mechanism at least forward and backward provided in the vicinity corresponding to a lumbar vertebra in the seat back.

* * * * *